United States Patent Office 3,536,651
Patented Oct. 27, 1970

3,536,651
AROMATIC POLYHYDRAZIDE SOLUTIONS
AND ARTICLES
August Henry Frazer, Wilmington, Del., assignor to E. I.
du Pont de Nemours and Company, Wilmington, Del.,
a corporation of Delaware
No Drawing. Filed Oct. 4, 1967, Ser. No. 672,735
Int. Cl. C08f 45/46
U.S. Cl. 260—30.8                 5 Claims

ABSTRACT OF THE DISCLOSURE

Film- and fiber-forming solutions comprised of aromatic polyhydrazides having recurring structural units of units of the formula:

(I) 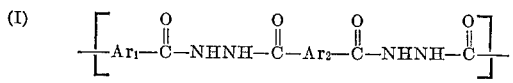

wherein $Ar_1$ and $Ar_2$ individually are either p-phenylene or m-phenylene with the proviso that at least 80 mole percent of these radicals be p-phenylene, dissolved in dimethyl sulfoxide containing lithium chloride. These solutions are utilized to form shaped articles of the polyhydrazide. Fibers which are so produced have usually high initial modulus values and the tensile properties of these fibers are further enhanced by heat treating them for 1–2 seconds in a nitrogen atmosphere maintained at 350–450° C.

---

This invention relates to novel and useful solutions of aromatic polyhydrazides and to fibers and films prepared therefrom.

DESCRIPTION OF THE PRIOR ART

Aromatic polyhydrazides, together with fibers and films, are described in Frazer U.S. 3,130,182 and in J. Poly. Sci., part A, vol. 2, 1147–1156 (1964).

SUMMARY OF THE INVENTION

This invention provides novel film- and fiber-forming solutions comprised of at least one type of aromatic polyhydrazide and/or copolyhydrazide characterized by repeating structural units of the fromula:

(I) 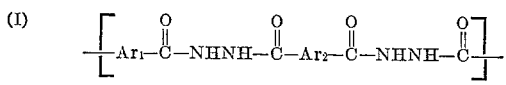

wherein $Ar_1$ and $Ar_2$ are selected from the group of p-phenylene and m-phenylene radicals with a proviso that at least about 80 mole percent of the aromatic radicals are p-phenylene; dimethyl sulfoxide; and lithium chloride. The invention also provides shaped articles formed from these solutions; the polyhydrazide films and fibers employed should have an inherent viscosity of at least 0.6, measured as described hereinafter.

Polyhydrazides corresponding to Formula I wherein less than 65 mole percent of the aromatic radicals in the polymer are p-phenylene radicals are described in the previously cited patent as soluble in dimethyl sulfoxide. It is reported in J. Poly. Sci., part A, vol. 2, 1150 (1964) that poly(terephthalic hydrazide), i.e., Formula I where $Ar_1$ and $Ar_2$ are both p-phenylene, is insoluble in dimethyl sulfoxide, as is the random copoly(terephthalic/isophthalic hydrazide) (50/50) prepared from terephthaloyl chloride, isophthaloyl chloride, and hydrazine. In contrast, the present invention provides solutions of aromatic polyhydrazides in which about 80 or more mole percent of the aromatic portion is composed of p-phenylene radicals. Tough films and fibers having unusually high as-extruded modulus values are prepared from these novel solutions. The tensile properties of these fibers are enhanced further by heat treating them for 1–2 seconds in a nitrogen atmosphere maintained at 350–450° C.

DESCRIPTION OF THE PREFERRED EMBODIMENTS

Polyhydrazide and copolyhydrazide preparation

The polymers useful for preparing the novel solutions of this invention may be prepared by the low temperature solution polymerization process described in Frazer U.S. 3,130,182. In this process, hydrazine or an aromatic dihydrazide is caused to react with an aromatic diacid chloride in a solvent medium. The reaction may be performed by combining an aromatic diacid chloride or a mixture of aromatic diacid chlorides with hydrazine or by combining one or more aromatic diacid chlorides with one or more dihydrazides of aromatic dicarboxylic acids. It is preferred to use preformed dihydrazides rather than hydrazine.

The polymerization solvent utilized is chosen from the group of weakly basic materials which not only exhibit high solvent power for the polymer but also serve as acceptors for the hydrogen chloride evolved during the polymerization. Among the suitable solvent media are N-methylpyrrolidone-2, hexamethylphosphoramide, N,N-dimethylacetamide, and N,N,N',N'-tetramethylurea. The solvent power of these amide polymerization media is enhanced by the addition thereto of, e.g., lithium chloride.

The polymerization procedure is conducted at low temperatures, i.e., not exceeding 100° C., and generally at room temperature or below. The aromatic dihydrazide is dispersed in the amide solvent, the dispersion cooled to, e.g., 0–30° C., and the aromatic diacid chloride is added slowly with stirring while maintaining the temperature at, e.g., 0–30° C. The reaction is allowed to continue until high molecular weight aromatic polyhydrazide is formed. The polymer may be isolated by combining the reaction mixture with a polymer non-solvent, e.g., water.

The useful aromatic dicarboxylic acid chlorides and aromatic dicarboxylic acid hydrazides useful in this invention are obtainned from isophthalic and terephthalic acids. More or less random copolyhydrazide may be produced by condensing a mixture of terephthaloyl chloride and isophthaloyl chloride with hydrazine, the terephthaloyl chloride being used in a ratio of at least about 80/20 over the isophthaloyl chloride. Ordered copolymers may be prepared by reacting the dihydrazide of one aromatic diacid with an equimolar amount of the diacid chloride of the second aromatic diacid formed by the same process from which two aromatic nuclei are interchanged (i.e., by reaction of the dihydrazide the second aromatic diacid with an equimolar quantity of the diacid chloride of the first aromatic diacid). The preferred composition for preparing the solutions of this invention is that in which both $Ar_1$ and $Ar_2$ in Formula I are p-phenylene, i.e., poly(terephthalic hydrazide).

Aromatic dihydrazides employed in this invention may be prepared by any of several well-known methods. Particularly convenient is the preparation from a dialkyl ester and hydrazine as shown herein in Example I, part A.

Solution preparation

The novel solutions of this invention are preferably prepared by first combining, at 0 to 40° C., a quantity of Formula I polyhydrazide with a mixture of dimethyl sulfoxide and lithium chloride containing from about 5 to 12 weight percent (preferably 10 weight percent) of lithium chloride (the weight percent being based upon the solvent/salt mixture) preferably with stirring. Additional dimethyl sulfoxyl may be added as desired, to form a solution containing from about 0.5 to 15 weight percent of polymer and about 1 to 10 weight percent of salt (polymer and salt weight percentages being based on the total solution). Formula I polyhydrazides having inherent viscosities of about 0.6 to 2.2 or higher, preferably about 1.67, are used to form these novel solutions.

The solution preferably consists essentially of the polyhydrazide, and lithium chloride in the amounts specified, with the remainder being dimethyl sulfoxide. However, certain other materials may be adventitiously present (e.g. trace amounts of water, metal ions) or may be purposely added (e.g. adding an insoluble acid such as toluenesulfonic acid to aid in the conversion of the polyhydrazide to the corresponding polyoxadiazole, as further discussed hereinafter).

Shaped articles

Solutions prepared in the above-described manner are stable at room temperature and after being heated as high as 110° C. These solutions may be extruded into fibers and cast into useful films by conventional solutions spinning and casting. These films are tough and self-supporting; the fibers have a usually high as-extruded modulus which is significantly higher than that of other aromatic polyhydrazide fibers. For example, the initial modulus disclosed in J. Poly. Sci., part A, vol. 2, 1154 (1964) for poly(isophthalic hydrazide) and poly(terephthalic/isophthalic hydrazide) fibers is 115 and 151 g./den., respectively. These values are significantly lower than those of the fibers of the present invention e.g., Example I, wherein poly(terephthalic hydrazide) fibers are shown to have an initial modulus value of 250 g./den. (as-extruded) and values of as high as 490 g./den. after a specified heat treatment. This treatment comprises soaking the as-extruded fiber or yarn in distilled water for 24 hrs., drying them, then heating them, taut, for a few seconds, preferably 1–2 seconds in a nitrogen atmosphere maintained at about 350–450° C. Other tensile properties of Formula I polyhydrazide fibers are also significantly improved by such a post-extrusion heat treatment process.

These shaped articles of Formula I polyhydrazides may be cyclodehydrated by the procedures described in Frazier U.S. 3,238,183 into the corresponding poly(1,3,4-oxadiazoles) characterized by repeating structural units of the formula:

(II)
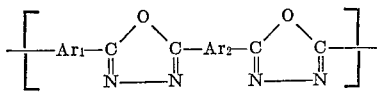

wherein $Ar_1$ and $Ar_2$ have the significance set forth hereinbefore. Thus, from the preferred poly(terephthalic hydrazide) may be prepared poly(1,4 - phenylene 1,3,4-oxadiazol-2,5-ylene).

Since the cyclodehydration of Formula I polyhydrazides occurs at temperature below the melting point thereof, melt shaping (e.g., spinning) is not suitable for the preparation of shaped articles of these polyhydrazides.

Various modifiers, such as antioxidants, antistatic agents, reinforcing particles, and the like may be incorporated in the shaped articles of this invention.

EXAMPLES

The following non-limiting examples are illustrative of the practice of the preferred embodiments of this invention. In these examples, inherent viscosity ($\eta_{inh}$) has been determined in accordance with the following equation:

$$\eta_{inh} = \frac{\ln(\eta_{rel})}{C}$$

wherein ($\eta_{rel}$) represents the relative viscosity, (C) represents a concentration of 0.5 gram of the polymer in 100 ml. of the solvent. The relative viscosity ($\eta_{rel}$) is determined by dividing the flow time in a capillary viscometer of a dilute solution of the polymer by the flow time for the pure solvent. The dilute solutions used herein for determining ($\eta_{rel}$) are of the concentration expressed by (C) above; flow times are determined at 30° C., using a mixture of dimethyl sulfoxide (90% by weight) and lithium chloride (10% by weight) as a solvent.

Fiber properties of tenacity, elongation, and initial modulus are coded as T/E/Mi and are in units of grams/denier, respectively.

The orientation angle of the fiber is determined by the general method described in Krimm and Tobolsky, Textile Research Journal, vol. 21, pp. 805–22 (1951).

Parts and percentages are by weight unless otherwise indicated.

EXAMPLE I

This example illustrates the preparation of poly(terephthalic hydrazide).

Part A

To 55 g. of dimethyl terephthalate dissolve in 2.5 l. of benzene are added 66 g. of hydrazine hydrate. This reaction mixture is heated at reflux for 4 days. The benzene is then decanted off and the residue is collected by filtration and washed twice with hot ethanol. Two syntheses run on the above-described scale provide a total of 83 g. of crude terephthalic dihydrazide. The combined yields are recrystallized from hot water and dried at 100° C./2 mm. to yield 77 g. of purified product.

Part B

A 500 ml. resin kettle is charged with 7.4 g. of the above-described recrystallized terephthalic dihydrazide and 250 ml. of solution of hexamethylphosphoramide containing 10% by weight lithium chloride. After these ingredients are first stirred for 15 minutes at 75° C., the kettle is then immersed in a bath of room temperature water and the contents stirred for 15 minutes more. Terephthaloyl chloride (7.83 g.) is then added to the kettle in 3 portions (2.83 g., 2.5 g., 2.5 g.). After each addition, 75 ml. of a mixture of hexamethylphosphoramide and lithium chloride (10% by weight) are added. After the last addition, another 100 ml. of a mixture of hexamethylphosphoramide and lithium chloride (10% by weight) are added. The reaction mixture is stirred for 1 hr. at room temperature, after it is poured into water to precipitate the polymer. The precipitated polymer is collected, washed with water and with methanol in a blender, and is dried overnight at 70° C. under 3 mm. pressure. There is obtained 11.3 g. of poly(terephthalic hydrazide), $\eta_{inh}=1.75$.

Part C

Repetition of the procedure in Part B, above, with the exception that after the second addition of terephthaloyl chloride there are added 150 ml. of a mixture of hexamethylphosphoramide and lithium chloride (10% by weight), produces 14 g. of recrystallized, dried polymer, $\eta_{inh}=1.55$.

EXAMPLE II

This example illustrates the preparation of a novel spinning solution of this invention and the preparation of fiber therefrom.

The product (11.3 g.) of Example I, Part B, above, and a portion (4 g.) of the product of Example I, Part C, are combined to give a quantity of poly(terephthalic hydrazide) having an inherent viscosity of 1.67. This material is combined at 30° C. with 25 g. of a mixture of dimethylsulfoxide containing 10% by weight lithium chloride and an additional 100 ml. (110 g.) of dimethylsulfoxide to produce a solution suitable for spinning.

The above-described solution, containing about 10% by weight polymer, about 1.6% by weight of lithium chloride and maintained at 90° C., is extruded through a spinneret (temp. 110° C.) into a drying column maintained at 250° C. and swept with a co-current flow of dry nitrogen which enters the column at 280° C. The emerging fibers are washed with water and are wound up on a bobbin. After being dried, the fibers exhibit the following properties: T/E/Mi: 2.5/2.1/250; orientation angle is 32°.

After the as-extruded fibers are heated in a nitrogen atmosphere for 1–2 seconds at the temperatures described below, the following tensile properties are observed:

| Heating temperature | T/E/Mi | Orientation angle, deg. |
|---|---|---|
| 350° C | 2.7/1.2/260 | 30 |
| 400° C | 6.0/1.3/490 | 18 |
| 450° C | 5.5/1.1/480 | 20 |

EXAMPLE III

This example illustrates the preparation of a film of poly(terephthalic hydrazide) from a novel solution of this invention.

A dispersion of 7.4 g. of terephthalic dihydrazide dispersed in 200 ml. of a mixture of hexamethylphosphoramide and lithium chloride (10% by weight) is stirred 2 hrs. at room temperature and then cooled to 20° C. To the cooled solution are added 7.83 g. of terephthaloyl chloride in 3 portions ( 2.83 g., 2.5 g., 2.5 g.). After both the second and third additions, 25 ml. of a mixture of hexamethylphosphoramide and lithium chloride (10% by weigtht) are added. The reaction mixture is stirred 1 hr. at room temperature, then is poured into water to precipitate the polymer.

The product is collected and is washed and dried as in Example II, above, to yield 11.5 g. of poly(terephthalic hydrazide), $\eta_{inh}$=0.73. A solution containing 10% by weight of the polymer is prepared in a mixture of dimethyl sulfoxide containing 10% by weight lithium chloride. A tough self-supporting film is wet cast from this solution.

EXAMPLE IV

This example illustrates the preparation of a film of copoly(terephthalic/isophthalic hydrazide), 90/100, from a solution of this invention.

Terephthalic dihydrazide (5.38 g.) and isophthalic dihydrazide (1.35 g.), prepared by the general procedure of Example I, Part A, are combined with 500 ml. of a solution of hexamethylphosphoramide containing 10% by weight lithium chloride. After these ingredients are stirred at room temperature for 1 hr., 7.05 g. of terephthaloyl chloride are added to the reaction vessel in three portions (3.05 g., 2.00 g., 2.00 g.). After the second and third additions, 150 ml. of and 100 ml., respectively, of the above-described hexamethylphosphoramide-lithium chloride solution are added. The reaction mixture is stirred for about an hour at room temperature after which the copolymer is precipitated, washed, and dried as in Example I, Part B. There is obtained 8.4 g. of poly(terephthalic/isophthalic hydrazide) (90/10), $\eta_{inh}$=0.93.

The synthesis described above is repeated three times to produce the following yields of product ($\eta_{inh}$ is shown in parentheses): 9.0 g. ($\eta_{inh}$=2.04), 7.5 g. ($\eta_{inh}$=1.22), and 7.9 g. ($\eta_{inh}$=1.01).

The combined yields of copolymers, above, are combined and mixed well. A 10 g. sample of this mixture is added to a solution composed of 90 g. of dimethyl sulfoxide and 10 g. of lithium chloride, after which an additional 50 ml. (55 g.) of dimethyl sulfoxide are added. These materials are stirred at room temperature to produce a dope containing about 6% by weight each of the copolyhydrazide and lithium chloride. The solution is cast into a tough self-supporting film.

EXAMPLE V

Summarized in the following Table I are the results of polyhydrazide and copolyhydrazide syntheses and solution preparations similar to those described in the previous Examples I–IV. The respective polymer and copolymers are combined with a mixture of dimethyl sulfoxide/lithium chloride (90/10 by weight) to form solutions of various weight percent polymer.

As Table I indicates, lithium chloride must be present to provide a stable solution. The (80/20) copoly(terephthalic/isophthalic hydrazide) polymer forms a stable solution having 15 weight percent polymer when lithium chloride is present but forms an unstable solution when such salt is not present.

In Table I, under "Polymer Composition," T and I represent the mole percent of terephthalic hydrazide and isophthalic hydrazide units, respectively, in the various copolymers. By the term "stabile solution" is meant a solution which does not gel on standing overnight at room temperature or when warmed at 90° C. for 1 hour.

TABLE I

| Polymer Composition mole percent | | | | Solution in dimethyl sulfoxide-lithium chloride | |
|---|---|---|---|---|---|
| T | I | $\eta$ inh | Yield, percent | Wt. percent polymer | Result |
| 100 | 0 | 2.20 | 96 | 10 | Stable solution. |
| 95 | 5 | 2.60 | 95 | 10 | Do. |
| 90 | 10 | 2.04 | 95 | 12 | Do. |
| 85 | 15 | 1.98 | 92 | 12 | Do. |
| 80 | 20 | 1.98 | 92 | 15 | Do. |
| 80 | 20 | 1.98 | 92 | 8 | Unstable solution.[1] |

[1] Dimethyl sulfoxide only, no salt present.

What is claimed is:

1. Film- and fiber-forming solution comprising about 0.5 to 15 weight percent of at least one polyhydrazide characterized by repeating structural units of the formula:

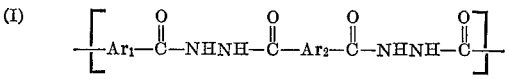

wherein $Ar_1$ and $Ar_2$ are individually selected from the group consisting of p-phenylene and m-phenylene radicals, with the proviso that at least 80 mole percent of said radicals are p-phenylene, said polyhydrazide having an inherent viscosity of at least about 0.6, when measured in dimethyl sulfoxide and lithium chloride, at a concentration of 0.5 gram of polymer per 100 ml. of solution at 30° C., and about 1 to 10 weight percent of lithium chloride, dissolved in dimethyl sulfoxide.

2. Solution of claim 1 wherein at least 85 mole percent of said radicals are p-phenylene.

3. Solution of claim 1 wherein essentially 100 mole percent of said radicals are p-phenylene.

4. Solution of claim 1 containing about 10 weight percent of lithium chloride.

5. Solution of claim 1 wherein said solution consists essentially of said polyhydrazide, said lithium chloride, and said dimethyl sulfoxide.

References Cited

UNITED STATES PATENTS

| | | | |
|---|---|---|---|
| 3,130,182 | 4/1964 | Frazer | 260—78 |
| 3,317,481 | 5/1967 | Youker | 260—30.8 X |
| 3,412,060 | 11/1968 | Sarem | 260—30.8 X |
| 3,068,188 | 12/1962 | Beste et al. | 260—78 |

OTHER REFERENCES

Noller Chemistry of Organic Compounds, W. B. Saunders Company, 1965, p. 118.

MORRIS LIEBMAN, Primary Examiner

S. M. PERSON, Assistant Examiner

U.S. Cl. X.R.

260—78